United States Patent
Matsushita et al.

(10) Patent No.: US 8,232,352 B2
(45) Date of Patent: Jul. 31, 2012

(54) RUBBER COMPOSITION AND TIRE USING THE SAME

(75) Inventors: Junko Matsushita, Tachikawa (JP); Yoichi Ozawa, Kodaira (JP); Ryuji Nakagawa, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 24 days.

(21) Appl. No.: 12/664,013

(22) PCT Filed: Jun. 10, 2008

(86) PCT No.: PCT/JP2008/060621
§ 371 (c)(1),
(2), (4) Date: May 18, 2010

(87) PCT Pub. No.: WO2008/153030
PCT Pub. Date: Dec. 18, 2008

(65) Prior Publication Data
US 2010/0218871 A1 Sep. 2, 2010

(30) Foreign Application Priority Data
Jun. 11, 2007 (JP) .................................. 2007-154120

(51) Int. Cl.
*C08L 9/00* (2006.01)
*C08L 9/06* (2006.01)

(52) U.S. Cl. ........ 525/240; 525/232; 152/450; 524/525; 524/415

(58) Field of Classification Search .................. 525/240, 525/232; 152/450; 524/525, 415
See application file for complete search history.

(56) References Cited

FOREIGN PATENT DOCUMENTS

| EP | 1 854 838 A1 | 11/2007 |
|---|---|---|
| EP | 1 854 839 A1 | 11/2007 |
| EP | 1 860 146 A1 | 11/2007 |
| JP | 2006-241355 A | 9/2006 |
| JP | 2006-241358 A | 9/2006 |
| JP | 2007-077317 A | 3/2007 |
| WO | 2006/098103 A1 | 9/2006 |
| WO | 2006/112450 A1 | 10/2006 |
| WO | 2007/040252 A1 | 4/2007 |
| WO | WO 2007/040252 * | 4/2007 |

OTHER PUBLICATIONS

Office Action dated Apr. 7, 2011 for corresponding Chinese Application No. 200880101276.1.
Supplementary European Search Report issued in Application No. EP 08777138; dated Jul. 6, 2010.
Chinese Office Action dated Dec. 13, 2011 corresponding to CN Application No. 200880101276.1.

* cited by examiner

*Primary Examiner* — Robert D. Harlan
(74) *Attorney, Agent, or Firm* — Sughrue Mion, PLLC

(57) ABSTRACT

There are provided a rubber composition simultaneously improving low loss factor and wear resistance as compared with the conventional ones as well as a tire using such a rubber composition.
The invention lies in a rubber composition using a modified conjugated diene rubber and being excellent in the low loss factor and wear resistance as well as a tire. The rubber composition of the invention is formed by compounding a filler to a rubber component containing (A) a modified conjugated diene rubber having a cis-bond content in conjugated diene portion of not less than 87% and a vinyl bond content of not more than 2% and containing a functional group reactive with a filler and (B) a modified polymer having a modifying functional group number per 1 molecule of an unmodified polymer of not less than 0.6.

15 Claims, No Drawings

RUBBER COMPOSITION AND TIRE USING THE SAME

TECHNICAL FIELD

This invention relates to a rubber composition and a tire using the same, and more particularly to a rubber composition being excellent in the low loss factor and wear resistance.

RELATED ART

Recently, it is demanded to develop a rubber composition being excellent in the low loss factor (low rolling resistance) and wear resistance as compared with the conventional ones in order to improve a fuel efficiency of an automobile and a tire durability under social demand on energy-saving and resource-saving.

It is common to use a rubber composition with a low heat buildup in a tire for reducing the rolling resistance of the tire. Also, it is very effective to use a polymer modified by a functional group interacting with a filler in the rubber composition for improving both of a low loss factor and a wear resistance in the rubber composition.

For instance, it is examined to use a modified high-cis polybutadiene rubber introduced with a functional group interacting with a filler in the rubber composition (WO 2006/112450). In the high-cis polybutadiene rubber produced by coordination polymerization under industrial conditions, however, a modifying functional group compatible with the filler is introduced into the polymer at only a modification ratio of about 10%. When such a modified polymer is used in the rubber composition, the effect of improving the dispersibility of large particle size carbon by the modifying functional group is confirmed, while the effect of improving the dispersibility to fine particle size carbon is not sufficient, so that the wear resistance of the rubber composition is not improved. This is revealed due to the fact that when the amount of the filler around the modified high-cis polybutadiene rubber is excessive over an optimum amount to the modifying functional group, the effect of improving the dispersibility of the filler by the modifying functional group is reduced drastically. On the other hand, when a modified polymer produced by anion polymerization capable of modifying not less than 80% of a polymer terminal by a functional group compatible with a filler is added to the rubber composition, the effect of largely lowering the loss factor of the rubber composition can be confirmed, but the wear resistance of the rubber composition is deteriorated as compared with a rubber composition compounded with an existing non-modified high-cis polybutadiene rubber.

DISCLOSURE OF THE INVENTION

It is, therefore, an object of the invention to solve the problems of the above conventional techniques and to provide a rubber composition simultaneously improving the low loss factor and the wear resistance as well as a tire using such a rubber composition.

The inventors have made various studies in order to achieve the above object and found that when a modified conjugated diene rubber being less in the low loss factor at fine particle size and a modified polymer produced by anion polymerization capable of modifying not less than 80% of a polymer terminal by a functional group compatible with a filler are blended in a rubber composition, the value of tan δ is cooperatively improved by these rubber components to provide a rubber composition improving the establishment of low loss factor and wear resistance, and as a result, the invention has been accomplished.

That is, the rubber composition using the modified conjugated diene rubber according to the invention is characterized by compounding a filler to a rubber component containing (A) a modified conjugated diene rubber having a cis-bond content in conjugated diene portion of not less than 87% and a vinyl bond content of not more than 2% and containing a functional group reactive with a filler and (B) a modified polymer having a modifying functional group number per 1 molecule of an unmodified polymer of not less than 0.6, and satisfying a relation of the following equation (I) with the filler, the conjugated diene rubber (A) and the modified polymer (B):

$$S_F \times W_F \times 10^7 / (W_A \times f_A / M_n(A) + W_B \times f_B / M_n(B)) \leq 11 \quad (I)$$

wherein $S_F$: cetyltrimethylammonium bromide (CTAB) adsorption specific surface area (m²/g) of a filler, $W_F$: amount (parts by mass) of a filler compounded per 100 parts by mass of a rubber component, $W_A$: amount (parts by mass) of a modified conjugated diene rubber (A) compounded per 100 parts by mass of a rubber component, $W_B$: amount (parts by mass) of a modified polymer (B) compounded per 100 parts by mass of a rubber component, $M_n(A)$: number average molecular weight of a modified conjugated diene rubber (A), $M_n(B)$: number average molecular weight of a modified polymer (B), $f_A$: modifying functional group number per 1 molecule of a modified conjugated diene rubber (A), and $f_B$: modifying functional group number per 1 molecule of a modified polymer (B).

In a preferable embodiment of the rubber composition using the modified conjugated diene rubber (A) according to the invention, the modified conjugated diene rubber (A) has a cis-bond content of not less than 94% and a vinyl bond content of not more than 1%.

In the rubber composition using the modified conjugated diene rubber according to the invention, it is preferable that the modifying functional group number of the modified polymer (B) per 1 molecule of the unmodified polymer is not less than 1.0.

In the rubber composition using the modified conjugated diene rubber according to the invention, the modified polymer (B) is preferable to have a functional group in at least one terminal.

In the rubber composition using the modified conjugated diene rubber according to the invention, it is preferable that a total content of the modified conjugated diene rubber (A) and the modified polymer (B) in the rubber component is not less than 10 mass %.

In the rubber composition using the modified conjugated diene rubber according to the invention, it is preferable that a total content of the modified conjugated diene rubber (A) and the modified polymer (B) in the rubber component is not less than 20 mass %.

In a preferable embodiment of the rubber composition using the modified conjugated diene rubber according to the invention, a mass ratio ((A)/(B)) of the above (A) to (B) is 30/70-90/10.

The rubber composition using the modified conjugated diene rubber according to the invention is preferable to further contain natural rubber or isoprene rubber.

In the rubber composition using the modified conjugated diene rubber (A) according to the invention, it is preferable that the modified polymer (B) is a modified polymer produced by anion polymerization and is a polymer having a structure of cis content of not more than 60%, vinyl bond content of not less than 10% and styrene content of not more than 20 mass % and being compatible with the modified conjugated diene rubber (A).

In a preferable embodiment of the rubber composition using the modified conjugated diene rubber according to the invention, the modified conjugated diene rubber (A) has a modifying functional group number of not less than 0.2 per 1 molecule of polymer.

In the rubber composition using the modified conjugated diene rubber according to the invention, the modified conjugated diene rubber (A) is preferable to be a terminal-modified high-cis polybutadiene rubber.

In the rubber composition using the modified conjugated diene rubber according to the invention, an inorganic filler and/or carbon black as the filler is included in an amount of 10-100 parts by mass per 100 parts by mass of the rubber component.

Also, the rubber composition using the modified conjugated diene rubber according to the invention is preferable to be sulfur-curable.

The tire according to the invention is manufactured by using the rubber composition using the modified conjugated diene rubber according to the invention in any of tire constitutional members. The tire constitutional member is preferable to be any one of tread, side rubber, rubber chafer and bead filler.

According to the invention, there can be provided a rubber composition being excellent in the low loss factor and wear resistance as well as a tire using the same.

BEST MODE FOR CARRYING OUT THE INVENTION

The rubber composition according to the invention is characterized by compounding a filler to a rubber component containing (A) a modified conjugated diene rubber having a cis-bond content in conjugated diene portion of not less than 87% and a vinyl bond content of not more than 2% and containing a functional group reactive with a filler and (B) a modified polymer having a modifying functional group number of not less than 0.6 per 1 molecule of an unmodified polymer, and satisfying a relation of the above equation (I) with the filler, the conjugated diene rubber (A) and the modified polymer (B).

In the rubber composition according to the invention, the feature that value of tan δ of the rubber composition is cooperatively improved by blending the modified conjugated diene rubber (A) and the modified polymer (B) is considered due to the fact that morphology around the modified conjugated diene rubber (A) is controlled by the modified polymer (B) and hence the modified conjugated diene rubber (A) easily develops the effect of lowering the loss factor in the rubber composition. Moreover, when the cis-bond content of the modified conjugated diene rubber (A) is less than 87%, the effect of lowering the loss factor in the rubber composition is insufficient. Therefore, the cis-bond content of the modified conjugated diene rubber (A) is preferably not less than 94%, further preferably not less than 97%, most preferably not less than 98%. Also, when the vinyl bond content of the modified conjugated diene rubber (A) exceeds 2%, the crystallinity lowers. Therefore, it is preferably not more than 1%, further preferably not more than 0.3%, most preferably not more than 0.2%. Furthermore, when the modifying functional group number of the modified polymer (B) per 1 molecule of unmodified polymer is less than 0.6, the merit of blending with the anion-polymerized polymer becomes less. Therefore, the modified polymer (B) is preferable to have the modifying functional group number of not less than 1.0 per 1 molecule of an unmodified polymer, and it is more preferable that both terminals of the polymer is, for example, modified by 60%. On the other hand, the modified polymer (B) is preferable to have a functional group in at least one terminal. Although the modified polymer (B) is obtained by modifying both terminals or by reacting a modified monomer, this polymer is sufficient to have a functional group in at least one terminal, and another place to be added with the functional group is not particularly limited. If at least one terminal in the polymer terminals of the modified polymer (B) is not provided with the functional group, the effect of sufficiently modifying the rubber composition with the modified polymer (B) is not obtained. In addition, when the value of left side of the equation (I) exceeds 11, the surface area of the filler to the rubber component becomes large and the effective modifying effect is not developed. Moreover, the number average molecular weight means a value converted to polystyrene as measured by a gel permeation chromatography (GPC).

The term "cis-bond content" used herein means a content of cis-bond in a conjugated diene compound unit of a polymer. Also, the term "modified polymer" means that a compound having a high compatibility with a filler is added to a homopolymer or a copolymer of a conjugated diene compound. As the conjugated diene compound are concretely mentioned, for example, 1,3-butadiene, isoprene, 1,3-pentadiene, 2,3-dimethylbutadiene, 2-phenyl-1,3-butadiene, 1,3-hexadiene and so on. They may be used alone or in a combination of two or more. As a compound used in copolymerization with these conjugated diene compound are mentioned aromatic vinyl compounds such as styrene, α-methylstyrene, 1-vinylnaphthalene, 3-vibyltoluene, ethylvinylbenzene, divinylbenzene, 4-cyclohexylstyrene, 2,4,6-trimethylstyrene and so on. They may be used alone or in a combination of two or more. Furthermore, the rubber component is preferable to contain natural rubber and/or isoprene. Moreover, the rubber composition according to the invention is required to contain a filler, but if the rubber composition does not contain the filler, the wear resistance of the rubber composition is deteriorated.

In the rubber composition according to the invention, a mass ratio ((A)/(B)) of the above (A) to the above (B) is preferably 30/70-90/10. Also, the total content of the above (A) and (B) in the rubber component is preferably not less than 10 mass %, more preferably 20 mass %. When the above (A) and (B) are outside such definitions, the rubber composition can not provide desirable properties sufficiently It is preferable that the modified conjugated diene rubber (A) is a modified conjugated diene compound produced by coordination polymerization and the modified polymer (B) is a modified polymer produced by anion polymerization. Since the modified conjugated diene compound produced by coordination polymerization has a very high stereoregularity, the durability becomes high. The modified polymer produced by anion polymerization has a significant effect of lowering loss factor because the modification efficiency is high. Also, the modified polymer (B) is preferable to be a polymer having a structure of a cis content of not more than 60%, a vinyl bond content of not less than 10% and a styrene content of not more than 20 mass % and being compatible with the modified conjugated diene rubber (A). In the modified polymer (B), when the cis content exceeds 60% and the vinyl bond content is less than 10% and the styrene content exceeds 20 mass %, the compatibility with the modified conjugated diene rubber (A) lowers and the effect of cooperatively improving tan δ of the rubber composition by blending of the modified conjugated diene rubber (A) and the modified polymer (B) is deteriorated. Also, when the modified polymer (B) is not compatible with the modified conjugated diene rubber (A), the dispersibility of carbon black in the modified polymer (B) is not good. Moreover, when these components are compatible with each other, as a viscoelasticity is measured under conditions of −100° C.-80° C. and 15 Hz, the peak of the viscoelasticity (tan δ peak) becomes typically a mountain or a broad mountain.

When the modified polymer is produced by anion polymerization, as an initiator is used an alkali metal compound, preferably a lithium compound. As the lithium compound are mentioned hydrocarbyllithium, lithium amide compounds and so on. When hydrocarbyllithium is used as an initiator, there is obtained a modified polymer having a hydrocarbyl group at its initiating terminal and a polymerization active site at the other terminal. On the other hand, when a lithiumamide compound is used as an initiator, there is obtained a modified polymer having a nitrogen-containing functional group at its initiating terminal and a polymerization active site at the other terminal, which can be used as a modified polymer in the invention without modifying with a modifying agent. Moreover, the amount of the lithium compound used as the initiator is preferable to be a range of 0.2-20 mmol per 100 g of the monomer.

As the hydrocarbyllithium are mentioned ethyllithium, n-propyllithium, isopropyllithium, n-butyllithium, sec-butyllithium, tert-octyllithium, n-decyllithium, phenyllithium, 2-naphthyllithium, 2-butyl-phenyllithium, 4-phenyl-butyllithium, cyclohexyllithium, cyclopentyllithium, a reaction product of diisopropenylbenzene and butyllithium and so on. Among them, alkyllithiums such as ethyllithium, n-propyllithium, isopropyllithium, n-butyllithium, sec-butyllithium, tert-octyllithium, n-decyllithium and the like are preferable, and n-butyllithium is particularly preferable.

On the other hand, as the lithiumamide compound are mentioned lithium hexamethyleneimide, lithium pyrrolidide, lithium pyperizide, lithium heptamethyleneimide, lithium dodecamethyleneimide, lithium dimethylamide, lithium diethylamide, lithium dipropylamide, lithium dibutylamide, lithium dihexylamide, lithium diheptylamide, lithium dioctylamide, lithium di-2-ethylhexylamide, lithium didecylamide, lithium-N-methylpiperazide, lithium ethylpropylamide, lithium ethylbutylamide, lithium methylbutylamide, lithium ethylbenzylamide, lithium methylphenetylamide and so on.

As the lithiumamide compound is used a lithiumamide compound represented by a formula: Li-AM [wherein AM is a substituted amino group represented by the following formula (II):

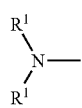

(II)

(wherein $R^1$ is independently an alkyl group having a carbon number of 1-12, a cycloalkyl group or an aralkyl group) or a cyclic amino group represented by the following equation (III):

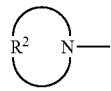

(II)

(wherein $R^2$ is an alkylene group having 3-16 methylene groups, a substituted alkylene group, an oxyalkylene group or N-alkylamino-alkylene group)], whereby there is obtained a modified polymer introduced with at least one nitrogen-containing functional group selected from the group consisting of a substituted amino group represented by the formula (II) and a cyclic amino group represented by the formula (III).

In the formula (II), $R^1$ is an alkyl group having a carbon number of 1-12, a cycloalkyl group or an aralkyl group and preferably includes methyl group, ethyl group, butyl group, octyl group, cyclohexyl group, 3-phenyl-1-propyl group, isobutyl group and so on. Moreover, $R^1$s may be same or different.

In the formula (III), $R^2$ is an alkylene group having 3-16 methylene groups, a substituted alkylene group, an oxyalkylene group or N-alkylamino-alkylene group. As the substituted alkylene group are included mono-substituted to octa-substituted alkylene groups, and the substituent includes a straight or branched alkyl group having a carbon number of 1-12, a cycloalkyl group, a bicycloalkyl group, an aryl group, an aralkyl group and so on. As $R^2$ are concretely preferable trimethylene group, tetramethylene group, hexamethylene group, oxydiethylene group, N-alkylazadiethylene group, dodecamethylene group and hexadecamethylene group.

The lithiumamide compound may be used in the polymerization reaction after the preliminary preparation from secondary amine and a lithium compound, or may be produced in a polymerization system. As the secondary amine are mentioned dimethylamine, diethylamine, dibutylamine, dioctylamine, dicyclohexylamine diisobutylamine and cyclic amines such as azacycloheptane (i.e. hexamethyleneimine), 2-(2-ethylhexyl)pyrrolidine, 3-(2-propyl)pyrrolidine, 3,5-bis(2-ethylhexyl)piperidine, 4-phenylpiperidine, 7-decyl-1-azacyclotridecane, 3,3-dimethyl-1-azacyclotetradecane, 4-dodecyl-1-azacyclooctane, 4-(2-phenylbutyl)-1-azacyclooctane, 3-ethyl-5-cyclohexyl-1-azacycloheptane, 4-hexyl-1-azacycloheptane, 9-isoamyl-1-azacycloheptadecane, 2-methyl-1-azacycloheptadece-9-ene, 3-isobutyl-1-azacyclododecane, 2-methyl-7-t-butyl-1-azacyclododecane, 5-nonyl-1-azacyclododecane, 8-(4'-methylphenyl)-5-pentyl-3-azabicyclo[5.4.0]undecane, 1-butyl-6-azabicyclo[3.2.1]octane, 8-ethyl-3-azabicyclo[3.2.1]octane, 1-propyl-3-azabicyclo[3.2.2]nonane, 3-(t-butyl)-7-azabicyclo[4.3.0]nonane, 1,5,5-trimethyl-3-azabicyclo[4.4.0]decane and so on. As the lithium compound is used the aforementioned hydrocarbyllithium.

the method of producing the modified polymer with the alkali metal compound as an initiator by anion polymerization is not particularly limited. For example, the modified polymer can be produced by polymerizing a conjugated diene compound alone or a mixture of a conjugated diene compound and a comonomer copolymerizable with the conjugated diene compound such as an aromatic vinyl compound or the like in a hydrocarbon solvent inactive to polymerization reaction. As the hydrocarbon solvent inactive to polymerization reaction are mentioned propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, ethylbenzene and so on. They may be used alone or in a blend of two or more.

The anion polymerization may be carried out in the presence of a randomizer. The randomizer can control the microstructure of the conjugated diene compound. For example, it controls 1,2-bond content of butadiene unit in a polymer using butadiene as a monomer, or has an action of randomizing butadiene unit and styrene unit in a copolymer using styrene and butadiene as a monomer. As the randomizer are mentioned dimethoxybenzene, tetrahydrofuran, dimethoxyethane, diethylene glycol dibutyl ether, diethylene glycol dimethyl ether, bistetrahydrofuryl propane, triethylamine, pyridine, N-methylmorpholine, N,N,N',N'-tetramethylethylene diamine, 1,2-dipiperidinoethane, potassium-t-amylate, potassium-t-butoxide, sodium-t-amylate and so on. The amount of the randomizer used is preferable to be a range of 0.01-100 mol equivalent per 1 mol of the alkali metal compound as an initiator.

The anion polymerization may be carried out by any of solution polymerization, vapor phase polymerization and bulk polymerization. In case of the solution polymerization, the concentration of the monomer in a solution is preferably a range of 5-50 mass %, more preferably a range of 10-30 mass %. Moreover, when the conjugated diene compound and the vinyl aromatic compound are used together as a monomer, the content of the vinyl aromatic compound in the monomer mixture is preferably a range of 3-50 mass %, more preferably a range of 4-45 mass %. Also, the polymerization system is not particularly limited, and may be a batch system or a continuous system.

The polymerizing temperature in the anion polymerization is preferably a range of 0-150° C., more preferably a range of 20-130° C. Also, the polymerization may be carried out under a developed pressure, but is preferable of be conducted under a pressure enough to keep the monomer used at substantially a liquid phase. When the polymerization reaction is carried out under a pressure higher than the developed pressure, it is preferable to pressurize the reaction system with an inert gas. Also, the starting materials used in the polymerization such as monomer, initiator, solvent and the like are preferable to be used after reaction-obstructing substances such as water, oxygen, carbon dioxide, protonic compound and the like are previously removed.

When the modified conjugated diene compound is produced by coordination polymerization, it is preferable to use a rare earth metal compound as an initiator, and it is further preferable to use a combination of the following (A) component, (B) component and (C) component. By the coordination polymerization is obtained a conjugated diene rubber having a polymerization active site.

The (A) component used in the coordination polymerization is selected from a rare earth metal compound and a complex compound between a rare earth metal compound and a Lewis base. As the rare earth metal compound are mentioned a carboxylate, an alkoxide, a β-diketone complex, a phosphate, a phosphite and the like of a rare earth element. As the Lewis base are mentioned acetylacetone, tetrahydrofuran, pyridine, N,N-dimethylformamide, thiophene, diphenyl ether, triethylamine, an organophosphrus compound, a monovalent or bivalent alcohol and so on. As a rare earth element of the rare earth metal compound are preferable lanthanum, neodymium, praseodymium, samarium, gadolinium, and among them neodymium is particularly preferable. As the (A) component are concretely mentioned neodymium tri-2-ethylhexanoate and a complex compound with acetylacetone thereof, neodymium trineodecanoate and a complex compound with acetylacetone thereof, neodymium tri-n-butoxide and so on. These (A) components may be used alone or in a combination of two or more.

The (B) component used in the coordination polymerization is selected from organoaluminum compounds. As the organoaluminum compound are concretely mentioned a trihydrocarbyl aluminum compound represented by a formula: $R^3_3Al$, a hysdrocarbyl aluminum hydride compound represented by a formula: $R^3_2AlH$ or $R^3AlH_2$ (wherein $R^3$ is independently a hydrocarbon residue having a carbon number of 1-30), a hydrocarbyl aluminoxane compound having a hydrocarbon residue with a carbon number of 1-30, and so on. As the organoaluminum compound are concretely mentioned trialkylaluminum, dialkylaluminum hydride, alkylaluminum dihydride, alkylaluminoxane and so on. These compounds may be used alone or in a combination of two or more. Moreover, as the (B) component, it is preferable to use aluminoxane together with the other organoaluminum compound.

The (C) component used in the coordination polymerization is selected from a compound having a hydrolyzable halogen or a complex compound with Lewis base thereof, an organic halogen compound having a tertiary alkyl halide, a benzyl halide or an allyl halide, an ionic compound composed of a non-coordinate anion and a counter cation, and so on. As the (C) component are concretely mentioned an alkylaluminum dichloride, a dialkylaluminum chloride, silicon tetrachloride, tin tetrachloride, a complex of zinc chloride with a Lewis base such as alcohol or the like, a complex of magnesium chloride with a Lewis base such as alcohol or the like, benzyl chloride, t-butyl chloride, benzyl bromide, t-butyl bromide, triphenylcarbonium tetrakis(pentafluorophenyl)borate and so on. These (C) components may be used alone or in a combination of two or more.

The initiator may be preliminarily prepared using the same conjugated diene compound as the polymerizable monomer and/or a non-conjugated diene compound, if necessary, other than the above (A), (B), (C) components. Also, a part or a whole of the (A) or (C) component may be used by carrying on an inert solid. The amount of each of the above components used may be set properly, but the (A) component is usually 0.001-0.5 mmol per 100 g of the monomer. Further, it is preferable that the (B) component/(A) component is 5-1000 and the (C) component/(A) component is 0.5-10 as a molar ratio.

The polymerizing temperature in the coordination polymerization is preferably a range of −80~150° C., more preferably −20~120° C. As a solvent used in the coordination polymerization may be used a reaction-inactive hydrocarbon solvent exemplified in the aforementioned anion polymerization, and the concentration of the monomer in the reaction solution is also the same as in the anion polymerization. Further, the reaction pressure in the coordination polymerization is the same as in the anion polymerization, and also it is desirable to substantially remove a reaction-obstructing substance such as water, oxygen, carbon dioxide, protonic compound or the like from the starting materials used in the reaction.

When an active site of the polymer having an active site, the conjugated diene rubber and so on is modified with a modifying agent, a nitrogen-containing compound, a silicon-containing compound, a tin-containing compound or the like may be used as a modifying agent.

As the nitrogen-containing compound usable as the modifying agent are mentioned bis(diethylamino)benzophenon, dimethylimidazolidinone, N-methylpyrrolidone, 4-dimethylaminobenzilidene aniline and the like. By using these nitrogen-containing compounds as a modifying agent can be introduced a nitrogen-containing functional group such as substituted or non-substituted amino group, amide group, imino group, imidazole group, nitrile group, pyridyl group or the like into the conjugated diene rubber.

As the silicon-containing compound usable as a modifying agent is preferably a hydrocarbyloxysilane compound. A hydrocarbyloxysilane compound represented by the following formula (IV) is more preferable.

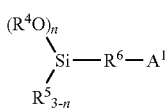
(IV)

Among functional groups in $A^1$ of the formula (IV), imine includes ketimine, aldimine and amidine, and (thio)carboxylate includes unsaturated carboxylates such as acrylate, methacrylate and the like. As a metal in a metal salt of (thio) carboxylic acid may be mentioned an alkali metal, an alkaline earth metal, Al, Sn, Zn and the like.

As $R^4$ and $R^5$ are mentioned an alkyl group having a carbon number of 1-20, an alkenyl group having a carbon number of 2-18, an aryl group having a carbon number of 6-18, an aralkyl group having a carbon number of 7-18, and so on. At this moment, the alkyl group and the alkenyl group may be any of straight, branched and cyclic ones, and include, for example, methyl group, ethyl group, n-propyl group, isopropyl group, n-butyl group, isobutyl group, sec-butyl group, tert-butyl group, pentyl group, hexyl group, octyl group, decyl group, dodecyl group, cyclopentyl group, cyclohexyl group, vinyl group, propenyl group, allyl group, hexenyl group, octenyl group, cyclopentenyl group, cyclohexenyl group and so on. Also, the aryl group may have a substituent such as a lower alkyl group or the like on its aromatic ring and includes, for example, phenyl group, tolyl group, xylyl group, naphthyl group and so on. Further, the aralkyl group may have a substituent such as a lower alkyl group or the like and includes, for example, benzyl group, phenetyl group, naphthylmethyl group and so on.

As a bivalent inactive hydrocarbon residue having a carbon number of 1-20 in $R^6$ is preferable an alkylene group having a carbon number of 1-20. The alkylene group may be any of straight, branched or cyclic ones, but the straight one is particularly preferable. As the straight alkylene group are mentioned methylene group, ethylene group, trimethylene group, tetramethylene group, pentamethylene group, hexamethylene group, octamethylene group, decamethylene group, dodecamethylene group and so on.

Also, n is an integer of 1-3, but is preferable to be 3. When n is 2 or 3, $R^4$Os may be same or different.

As the hydrocarbyloxysilane compound represented by the formula (IV), for example, (thio)epoxy group-containing hydrocarbyloxysilane compound may be mentioned 2-glycidoxyethyl trimethoxysilane, 2-glycidoxyethyl triethoxysilane, (2-glycidoxyethyl)methyl dimethoxysilane, 3-glycidoxypropyl trimethoxysilane, 3-glycidoxypropyl triethoxysilane, (3-glycidoxypropyl)methyl dimethoxysilane, 2-(3,4-epoxycyclohexyl)ethyl trimethoxysilane, 2-(3,4-epoxycyclohexyl)ethyl triethoxysilane, 2-(3,4-epoxycyclohexyl)ethyl(methyl) dimethoxysilane and compounds in which epoxy group in the above compounds is replaced with thioepoxy group. Among them, 3-glycidoxypropyl trimethoxysilane and 3-glycidoxypropyl triethoxysilane are particularly preferable.

As the imine group-containing hydrocarbyloxysilane compound may be mentioned N-(1,3-dimethylbutylidene)-3-(triethoxysilyl)-1-propane amine, N-(1-methylethylidene)-3-(triethoxysilyl)-1-propane amine, N-ethylidene-3-(triethoxysilyl)-1-propane amine, N-(1-methylpropylidene)-3-(triethoxysilyl)-1-propane amine, N-(4-N,N-dimethylaminobenzylidene)-3-(triethoxysilyl)-1-propane amine, N-(cyclohexylidene)-3-(triethoxysilyl)-1-propane amine, as well as trimethoxysilyl compounds, methyldiethoxysilyl compounds, ethyldiethoxysilyl compounds, methyldimethoxysilyl compounds and ethyldimethoxysilyl compounds corresponding to these triethoxysilyl compounds, and so on. Among them, N-(1-methylpropylidene)-3-(triethoxysilyl)-1-propane amine and N-(1,3-dimethylbutylidene)-3-(triethoxysilyl)-1-propane amine are particularly preferable.

As the imine (amidine) group-containing compound are mentioned 1-[3-(triethoxysilyl)propyl]-4,5-dihydroimidazole, 1-[3-(trimethoxysilyl)propyl]-4,5-dihydroimdazole, N-(3-triethoxysilylpropyl)-4,5-dihydroimidazole, N-(3-isopropoxysilylpropyl)-4,5-dihydroimidazole, N-(3-methldiethoxysilylpropyl)-4,5-dihydroimidazole and so on. Among them, N-(3-triethoxysilylpropyl)-4,5-dihydroimidazole is preferable.

Further, there may be mentioned the following other hydrocarbyloxysilane compounds. That is, as the carboxylate group-containing compound are mentioned 3-methacryloyloxypropyl triethoxysilane, 3-methacrylolloxypropyl trimethoxysilane, 3-methacryloyloxypropylmethyl diethoxysilane, 3-methacryloyloxypropyl triisopropoxysilane and so on. Among them, 3-methacryloyloxypropyl trimethoxysilane is preferable.

As the isocyanate group-containing compound are mentioned 3-isocyanatopropyl trimethoxysilane, 3-isocyanatopropyl triethoxysilane, 3-isocyanatopropylmethyl diethoxysilane, 3-isocyanatopropyl triisopropyxysilane and so on. Among them, 3-isocyanatopropyl triethoxysilane is preferable.

As the carboxylic anhydride containing compound are mentioned 3-triethoxysilylpropyl succinic anhydride, 3-trimethoxysilylpropyl succinic anhydride, 3-methyldiethoxysilylpropyl succinic anhydride and so on. Among them, 3-triethoxysilylpropyl succinic anhydride is preferable.

The above hydrocarbyloxysilane compounds may be used alone or in a combination of two or more. Also, a partial condensate of the hydrocarbyloxysilane compound may be used.

As the modifying agent is also preferable a coupling agent represented by the following formula (V):

(V)

[wherein $R^7$ is independently selected from the group consisting of an alkyl group having a carbon number of 1-20, a cycloalkyl group having a carbon number of 3-20, an aryl group having a carbon number of 6-20 and an aralkyl group having a carbon number of 7-20; Z is tin or silicon; X is independently chlorine or bromine; a is 0-3, b is 1-4 provided that a+b=4] or by the following formula (VI):

(VI)

[wherein $R^7$, Z and X are the same meanings as mentioned above; c is $0~2(d+19-1$, d is not less than 2, e is $1~2(d+1)$ provided that c+e=2(d+1)]. The conjugated diene rubber modified with the coupling agent of the formula (V) or (VI) has at least one tin-carbon bond or silicon-carbon bond. In the formulae (V) and (VI), $R^7$ bis independently an alkyl group having a carbon number of 1-20, a cycloalkyl group having a carbon number of 3-20, an aryl group having a carbon number of 6-20 and an aralkyl group having a carbon number of 7-20. As a concrete example of $R^7$ are mentioned methyl group, ethyl group, n-butyl group, neophyl group, cyclohexyl group, n-octyl group, 2-ethylhexyl group and so on. Also, Z is tin or silicon, and X is independently chlorine or bromine. As the coupling agent of the formula (V) are preferable tin tetrachloride, $R^7SnCl_3$, $R^7_2SnCl_2$, $R^7_3SnCl$ and so on, and tin tetrachloride is particularly preferable. As the coupling agent of the formula (VI) are concretely mentioned $Si_2Cl_6$, $Si_3Cl_8$, $R^7Si_2Cl_5$, $R^7{}_2Si_2Cl_4$, $R^7{}_3Si_2Cl_3$ and so on, and $Si_2Cl_6$ is particularly preferable.

The modification reaction is preferable to be carried out by a solution reaction, and the monomer used in the polymerization may be included in such a solution. Also, the modification reaction type is not particularly limited and may be a batch type or a continuous type. Further, the reaction temperature of the modification reaction is not particularly limited as long as the reaction proceeds, and the reaction temperature of the polymerization reaction may be adopted as it is.

The modified conjugated diene rubber (A) is preferable to have a modifying functional group number of not less than 0.2 per 1 molecule of polymer. When the modifying functional group number per 1 molecule of polymer is less than 0.2, the effect of improving the dispersibility of the filler such as carbon black or the like becomes small. Moreover, although the modifying functional group number of the modified conjugated diene compound produced by coordination polymerization per 1 molecule of polymer is about 0.1 in the conventional method, it is possible to improve the modifying functional group number to not less than 0.2 by optimizing the use conditions of the catalyst in the polymerization.

It is preferable that the modified conjugated diene rubber (A) is a terminal-modified high-cis polybutadiene rubber and the modified polymer (B) has a modifying functional group number of not less than 0.6 per 1 molecule of polymer. By combining these components and compounding them into the rubber composition is cooperatively improved the value of tan δ of the rubber composition, whereby there can be provided a rubber composition having an excellent balance between low loss factor and wear resistance. When the modifying functional group number per 1 molecule of polymer is less than 0.60, if the amount of the modified polymer compounded into the rubber composition is small, the effect of reducing the loss factor by the modified polymer is insufficient.

In a preferable embodiment of the rubber composition according to the invention, an inorganic filler and/or carbon black as the filler is included in an amount of 10-100 parts by mass per 100 parts by mass of the rubber component. When the compounding amount is less than 10 parts by mass, the wear resistance of the rubber composition becomes easily insufficient, while when it exceeds 100 parts by mass, the low loss factor of the rubber composition is easily deteriorated. As the inorganic filler are preferably mentioned silica, talc, aluminum hydroxide and so on.

The rubber composition according to the invention may be compounded with various chemicals usually used in the rubber industry such as vulcanizing agent, vulcanization accelerator, process oil, antioxidant, scorch retarder, zinc oxide, stearic acid and the like without damaging the object of the invention.

The rubber composition according to the invention is preferable to be sulfur-crosslinkable and it is preferable to use sulfur or the like as a vulcanizing agent. The amount used as a sulfur content is preferably 0.1-10.0 parts by mass, more preferably 1.0-5.0 parts by mass per 100 parts by mass of the rubber component. When the amount is not less than 0.1 part by mass, the fracture strength, wear resistance and low heat buildup of a vulcanized rubber are good, while when it is not more than 10.0 parts by mass, the rubbery resilience is good.

The rubber composition according to the invention is obtained according to the above compounding recipe by milling with a kneading machine such as roll, internal mixer or the like, and then shaped and vulcanized, whereby there can be used to tire applications such as tire tread, undertread, sidewall, carcass coating rubber, belt coating rubber, bead filler, chafer, bead coating rubber and the like but also applications such as rubber vibration isolator, belt, hose, and other industrial products.

The tire of the invention is manufactured by the usual method other than the rubber composition according to the invention is used in any of tire constructional members. That is, the rubber composition according to the invention containing the above various chemicals is shaped into various members at an uncured stage, which are attached on a tire building machine by the usual method to form a green tire. The green tire is heated and pressurized in a vulcanizing mold to obtain a tire. As the tire constructional member is preferable any one of the tread, side rubber, rubber chafer and bead filler.

EXAMPLES

The following examples are given in illustration of the invention and are not intended as limitations thereof. Also, various modifications may be properly conducted without damaging the scope of the invention.

Comparative Examples 1-10 and Examples 1-6

A rubber composition is milled and prepared according to a compounding recipe shown in the following Table 1 (unit: parts by mass) using a Banbury mixer. Thereafter, 3% tan δ and wear resistance of the rubber composition are evaluated by the following methods. the results are shown in Table 1.

(Measurement of 3% Tan δ)

Tan δ is measured at a temperature of 50° C., a frequency of 15 Hz and a strain of 3% using a viscoelasticity measuring apparatus made by Rheometrix Co., Ltd. and represented by an index on the basis that the value of 3% tan δ in the rubber composition of Comparative Example 1 is 100. The smaller the value of 3% tan δ, the better the low loss factor (low heat buildup).

(Measurement of Wear Resistance)

A worn amount of the rubber composition is measured at room temperature and a slip ratio of 60% using a Lambourn abrasion tester and represented by an index on the basis that the worn amount of the rubber composition of Comparative Example 1 is 100. The larger the index value, the smaller the worn amount and the better the wear resistance.

(Measurement of Tan δ Peak)

The viscoelasticity (tan δ) of the rubber composition is measured at 15 Hz within a range of −100~80° C. to depict a graph plotting an operating temperature on an abscissa and a viscoelasticity on an ordinate to thereby read the shape in the graph.

(Measurement of Mooney Viscosity [ML1+4(100° C.)])

It is measured according to JIS K6300 with a L rotor under conditions that a preheating time is 1 minute, an operating time of the rotor is 4 minutes and a temperature is 100° C.

(Calculation of Molecular Weight Distribution (Mw/Mn)]

It is measured using a gel permeation chromatography (trade name "HLC-8120GPC", made by Tosoh Co., Ltd.) and a differential refractometer as a detector under the following conditions and then calculated as a standard polystyrene converted value.

Column: trade name "GMHXL" (made by Tosoh Co., Ltd.) two columns series connection
Column temperature: 40° C.
Mobile phase: tetrahydrofuran
Flow rate: 1.0 ml/min
Sample concentration: 10 mg/20 ml (Measurement of Microstructure [cis-1,4 Bond Content (%), 1,2-vinyl Bond Content (%)])

It is measured by an infrared method (Morrero method) using a Fourier transform infrared spectrophotometer(trade name, "FT/IR-4100", made by JASCO Corporation).

TABLE 1-1

|  |  | Comparative Example 1 | Comparative Example 2 | Comparative Example 3 | Comparative Example 4 | Comparative Example 5 | Comparative Example 6 |
|---|---|---|---|---|---|---|---|
| Components (parts by mass) | Rubber component 1 *1 | 50 |  |  |  | 35 |  |
|  | Rubber component 2 *2 |  | 50 |  |  |  |  |
|  | Rubber component 3 *3 |  |  | 50 |  |  | 5 |
|  | Rubber component 4 *4 |  |  |  |  |  |  |
|  | Rubber component 5 *5 |  |  |  |  |  |  |
|  | Rubber component 6 *6 |  |  |  | 50 | 15 | 45 |
|  | Rubber component 7 *7 |  |  |  |  |  |  |
|  | Rubber component 8 *8 |  |  |  |  |  |  |
|  | Rubber component 9 *9 |  |  |  |  |  |  |
|  | Rubber component 10 *16 |  |  |  |  |  |  |
|  | Natural rubber | 50 | 50 | 50 | 50 | 50 | 50 |
|  | Carbon black *10 | 50 | 50 | 50 | 50 | 50 | 50 |
|  | Stearic acid | 2.0 | 2.0 | 2.0 | 2.0 | 2.0 | 2.0 |
|  | Antioxidant *11 | 2.0 | 2.0 | 2.0 | 2.0 | 2.0 | 2.0 |
|  | Antioxidant *12 | 1.0 | 1.0 | 1.0 | 1.0 | 1.0 | 1.0 |
|  | Zinc oxide | 2.5 | 2.5 | 2.5 | 2.5 | 2.5 | 2.5 |
|  | Vulcanization accelerator D-G *13 | 0.2 | 0.2 | 0.2 | 0.2 | 0.2 | 0.2 |
|  | Vulcanization accelerator DM-P *14 | 0.2 | 0.2 | 0.2 | 0.2 | 0.2 | 0.2 |
|  | Vulcanization accelerator NS-P *15 | 0.5 | 0.5 | 0.5 | 0.5 | 0.5 | 0.5 |
|  | Sulfur | 1.3 | 1.3 | 1.3 | 1.3 | 1.3 | 1.3 |
| Properties of rubber composition | 3% tan δ (index) | 100 | 104 | 95 | 76 | 90 | 78 |
|  | Wear resistance (index) | 100 | 85 | 108 | 89 | 97 | 92 |
|  | Shape of tan δ peak | one mountain | one mountain | one mountain | one mountain | one mountain | one mountain |
|  | Value of left side in equation (1) | — | — | 16.0 | 3.1 | 10.3 | 3.4 |

TABLE 1-2

|  |  | Comparative Example 7 | Comparative Example 8 | Comparative Example 9 | Comparative Example 10 | Comparative Example 11 |
|---|---|---|---|---|---|---|
| Components (parts by mass) | Rubber component 1 *1 |  |  |  |  |  |
|  | Rubber component 2 *2 |  |  |  |  |  |
|  | Rubber component 3 *3 |  |  | 25 | 40 |  |
|  | Rubber component 4 *4 |  |  |  |  |  |
|  | Rubber component 5 *5 |  | 50 |  |  |  |
|  | Rubber component 6 *6 |  |  |  |  |  |
|  | Rubber component 7 *7 |  |  | 50 |  | 10 |
|  | Rubber component 8 *8 |  |  | 25 |  |  |
|  | Rubber component 9 *9 |  |  |  | 10 |  |

TABLE 1-2-continued

|  |  | Comparative Example 7 | Comparative Example 8 | Comparative Example 9 | Comparative Example 10 | Comparative Example 11 |
|---|---|---|---|---|---|---|
|  | Rubber component 10 *16 |  |  |  |  | 40 |
|  | Natural rubber | 50 | 50 | 50 | 50 | 50 |
|  | Carbon black *10 | 50 | 50 | 50 | 50 | 50 |
|  | Stearic acid | 2.0 | 2.0 | 2.0 | 2.0 | 2.0 |
|  | Antioxidant *11 | 2.0 | 2.0 | 2.0 | 2.0 | 2.0 |
|  | Antioxidant *12 | 1.0 | 1.0 | 1.0 | 1.0 | 1.0 |
|  | Zinc oxide | 2.5 | 2.5 | 2.5 | 2.5 | 2.5 |
|  | Vulcanization accelerator D-G *13 | 0.2 | 0.2 | 0.2 | 0.2 | 0.2 |
|  | Vulcanization accelerator DM-P *14 | 0.2 | 0.2 | 0.2 | 0.2 | 0.2 |
|  | Vulcanization accelerator NS-P *15 | 0.5 | 0.5 | 0.5 | 0.5 | 0.5 |
|  | Sulfur | 1.3 | 1.3 | 1.3 | 1.3 | 1.3 |
| Properties of rubber composition | 3% tan δ (index) | 97 | 70 | 88 | 87 | 90 |
|  | Wear resistance (index) | 102 | 93 | 95 | 104 | 102 |
|  | Shape of tan δ peak | one mountain | one mountain | two mountains | one mountain | one mountain |
|  | Value of left side in equation (1) | 10 | 1.8 | 5.3 | 11.1 | 9.8 |

TABLE 2-1

|  |  | Example 1 | Example 2 | Example 3 | Example 4 | Example 5 |
|---|---|---|---|---|---|---|
| Components (parts by mass) | Rubber component 1 *1 |  |  |  |  |  |
|  | Rubber component 2 *2 |  |  |  |  |  |
|  | Rubber component 3 *3 | 40 | 25 | 15 |  |  |
|  | Rubber component 4 *4 |  |  |  | 40 |  |
|  | Rubber component 5 *5 |  |  |  |  | 40 |
|  | Rubber component 6 *6 | 10 | 25 | 35 | 10 | 10 |
|  | Rubber component 7 *7 |  |  |  |  |  |
|  | Rubber component 8 *8 |  |  |  |  |  |
|  | Rubber component 9 *9 |  |  |  |  |  |
|  | Rubber component 11 *17 |  |  |  |  |  |
|  | Rubber component 12 *18 |  |  |  |  |  |
|  | Rubber component 13 *19 |  |  |  |  |  |
|  | Rubber component 14 *20 |  |  |  |  |  |
|  | Natural rubber | 50 | 50 | 50 | 50 | 50 |
|  | Carbon black *10 | 50 | 50 | 50 | 50 | 50 |
|  | Stearic acid | 2.0 | 2.0 | 2.0 | 2.0 | 2.0 |
|  | Antioxidant *11 | 2.0 | 2.0 | 2.0 | 2.0 | 2.0 |
|  | Antioxidant *12 | 1.0 | 1.0 | 1.0 | 1.0 | 1.0 |
|  | Zinc oxide | 2.5 | 2.5 | 2.5 | 2.5 | 2.5 |
|  | Vulcanization accelerator D-G *13 | 0.2 | 0.2 | 0.2 | 0.2 | 0.2 |
|  | Vulcanization accelerator DM-P *14 | 0.2 | 0.2 | 0.2 | 0.2 | 0.2 |

TABLE 2-1-continued

|  |  | Example 1 | Example 2 | Example 3 | Example 4 | Example 5 |
|---|---|---|---|---|---|---|
|  | Vulcanization accelerator NS-P *15 | 0.5 | 0.5 | 0.5 | 0.5 | 0.5 |
|  | Sulfur | 1.3 | 1.3 | 1.3 | 1.3 | 1.3 |
| Properties of rubber composition | 3% tan δ (index) | 81 | 78 | 73 | 82 | 85 |
|  | Wear resistance (index) | 107 | 104 | 100 | 101 | 104 |
|  | Shape of tan δ peak | one mountain | one mountain | one mountain | one mountain | one mountain |
|  | Value of left side in equation (1) | 8.5 | 5.1 | 4.1 | 8.5 | 6.9 |

TABLE 2-2

|  |  | Example 6 | Example 7 | Example 8 | Example 9 | Example 10 |
|---|---|---|---|---|---|---|
| Components (parts by mass) | Rubber component 1*1 |  |  |  |  |  |
|  | Rubber component 2*2 |  |  |  |  |  |
|  | Rubber component 3*3 | 40 |  |  | 40 | 40 |
|  | Rubber component 4*4 |  |  |  |  |  |
|  | Rubber component 5*5 |  |  |  |  |  |
|  | Rubber component 6*6 |  |  |  |  |  |
|  | Rubber component 7*7 | 10 | 10 | 10 |  |  |
|  | Rubber component 8*8 |  |  |  |  |  |
|  | Rubber component 9*9 |  |  |  |  |  |
|  | Rubber component 11*17 |  | 40 |  |  |  |
|  | Rubber component 12*18 |  |  | 40 |  |  |
|  | Rubber component 13*19 |  |  |  | 10 |  |
|  | Rubber component 14*20 |  |  |  |  | 10 |
|  | Natural rubber | 50 | 50 | 50 | 50 | 50 |
|  | Carbon black*10 | 50 | 50 | 50 | 50 | 50 |
|  | Stearic acid | 2.0 | 2.0 | 2.0 | 2.0 | 2.0 |
|  | Antioxidant*11 | 2.0 | 2.0 | 2.0 | 2.0 | 2.0 |
|  | Antioxidant*12 | 1.0 | 1.0 | 1.0 | 1.0 | 1.0 |
|  | Zinc oxide | 2.5 | 2.5 | 2.5 | 2.5 | 2.5 |
|  | Vulcanization accelerator D-G*13 | 0.2 | 0.2 | 0.2 | 0.2 | 0.2 |
|  | Vulcanization accelerator DM-P*14 | 0.2 | 0.2 | 0.2 | 0.2 | 0.2 |
|  | Vulcanization accelerator NS-P*15 | 0.5 | 0.5 | 0.5 | 0.5 | 0.5 |
|  | Sulfur | 1.3 | 1.3 | 1.3 | 1.3 | 1.3 |

TABLE 2-2-continued

|  |  | Example 6 | Example 7 | Example 8 | Example 9 | Example 10 |
|---|---|---|---|---|---|---|
| Properties of rubber composition | 3% tan δ (index) | 72 | 78 | 81 | 76 | 83 |
|  | Wear resistance (index) | 110 | 110 | 106 | 109 | 110 |
|  | Shape of tan δ peak | one mountain | one mountain | one mountain | one mountain | one mountain |
|  | Value of left side in equation (1) | 6.1 | 8.3 | 8.8 | 8.1 | 8.4 |

*1: made by Ube Industries, Ltd. 150L (non-modified high-cis polybutadiene rubber, cis content: 97%)
*2: non-modified low-cis polybutadiene rubber prepared by the following method
*3: DEAB-modified high-cis polybutadiene rubber 1 prepared by the following method
*4: DEAB-modified high-cis polybutadiene rubber 2 prepared by the following method
*5: 2,4-dinitrobenzenesulfonyl chloride-modified high-cis polybutadiene rubber prepared by the following method
*6: DEAB-modified anion polymer 1 prepared by the following method
*7: both terminal-modified anion polymer prepared by the following method
*8: high-styrene SBR anion polymer prepared by the following method
*9: DEAB-modified anion polymer 2 prepared by the following method
*10: SAF, $N_2SA$ = 140 $(m^2/g)$, CTAB specific surface area = 138 $(m^2/g)$
*11: SANTITE A, made by Seiko-Chemical Co., Ltd.
*12: N-(1,3-dimethylbutyl)-N'-phenyl-p-phenylenediamine, made by OUCHI SHINKO Chemical Industrial Co., Ltd.
*13: 1,3-diphenylguanidine, made by OUCHI SHINKO Chemical Industrial Co., Ltd.
*14: di-2-benzothiazolyl disulfide, made by OUCHI SHINKO Chemical Industrial Co., Ltd.
*15: N-tert-butyl-2-benzothiazolyl sulfenamide, made by OUCHI SHINKO Chemical Industrial Co., Ltd.
*16: DEAB-modified high-cis polybutadiene rubber 3 prepared by the following method
*17: modified diene-based polymer 1 prepared by the following method
*18: modified diene-based polymer 2 prepared by the following method
*19: DEAB-modified anion polymer 3 prepared by the following method
*20: modified diene-based polymer 3 prepared by the following method (Method of Preparing Non-Modified Low-Cis Polybutadiene Rubber (Rubber Component 2))

A glass bottle of about 1 liter in volume provided with a rubber plug is dried and replaced with nitrogen, and a solution of dried and purified butadiene in cyclohexane and a dried cyclohexane are charged thereinto so as to render into a state of charging 400 g of a solution of 12.0% butadiene in cyclohexane. Then, 0.30 mL of tert-butyllithium (1.57 M) and 0.185 mL of 2,2-di(2-tetrahydrofuryl)propane (0.2M) are added to conduct polymerization in a water bath of 50° C. for 1.5 hours. Thereafter, the resulting product is re-precipitated in isopropanol containing a slight amount of NOCRAC NS-5 and dried on a drum to obtain a polymer in a yield of approximately 100%. The cis-content is 35%.

(Method of Preparing Catalyst Solution)

Into a glass bottle of 100 milliliter in volume dried, purged with nitrogen and provided with a rubber plug are charged 7.11 g of a solution of butadiene in cyclohexane (15.2 mass %), 0.59 milliliter of a solution of neodymium neodecanoate in cyclohexane (0.56 M), 10.32 milliliter of a solution of methylaluminoxane MAO (made by Tosoh-Aquzo Co., Ltd. PMAO) in toluene (3.23M as an aluminum concentration) and 7.77 milliliter of hydrogenated diisobutyl aluminum (made by Kanto Kagaku Co., Ltd.) in hexane (0.90M) in this order, which are matured at room temperature for 4 minutes and added with 2.36 milliliter of chlorinated diethylaluminum (made by Kanto Kagaku Co., Ltd.) in hexane (0.95M) and then matured at room temperature for 15 minutes while stirring occasionally. The concentration of neodymium in the resulting catalyst solution is 0.011M.

(Method of Preparing DEAB-Modified High-Cis Polybutadiene Rubber 1 (Rubber Component 3))

A glass bottle of about 1 liter in volume provided with a rubber plug is dried and replaced with nitrogen, and a solution of dried and purified butadiene in cyclohexane and a dried cyclohexane are charged thereinto so as to render into a state of charging 400 g of a solution of 12.0% butadiene in cyclohexane. Then, 1.56 milliliter of the above prepared catalyst solution (0.017 mmol as a concentration converted to neodymium) is charged to conduct polymerization in a water bath of 50° C. for 1.5 hours. Thereafter, 0.005 mmol of 4,4'-diethylaminobenzophenone (DEAB) is added at 50° C. and further reacted for 1 hour. The resulting product is re-precipitated in isopropanol containing a slight amount of NOCRAC NS-5 and dried on a drum to obtain a polymer in a yield of approximately 100%. In the polymer, the modification efficiency is 20%, the cis content is 96%, the number average molecular weight (Mn) is 180,000 and the vinyl bond content is 0.7%. The modification efficiency is calculated from an ultraviolet absorption of DEAB through a gel permeation chromatography.

(Method of Preparing DEAB-Modified High-Cis Polybutadiene Rubber 2 (Rubber Component 4))

A glass bottle of about 1 liter in volume provided with a rubber plug is dried and replaced with nitrogen, and a solution of dried and purified butadiene in cyclohexane and a dried cyclohexane are charged thereinto so as to render into a state of charging 400 g of a solution of 12.0% butadiene in cyclohexane. Then, 1.56 milliliter of the above prepared catalyst solution (0.017 mmol as a concentration converted to neodymium) is charged to conduct polymerization in a water bath of 70° C. for 1.5 hours. Thereafter, 0.005 mmol of 4,4'-diethylaminobenzophenone (DEAB) is added at 50° C. and further reacted for 1 hour. The resulting product is re-precipitated in isopropanol containing a slight amount of NOCRAC NS-5 and dried on a drum to obtain a polymer in a yield of approximately 100%. In the polymer, the modification efficiency is 20%, the cis content is 88%, the number average molecular weight (Mn) is 178,000 and the vinyl bond content is 0.9%. The modification efficiency is calculated from an ultraviolet absorption of DEAB through a gel permeation chromatography.

(Method of Preparing 2,4-dinitrobenzenesulfonyl Chloride-Modified High-Cis Polybutadiene Rubber (Rubber Component 5))

Into a glass bottle of about 1 liter in volume and provided with a rubber plug are added 50 g of non-modified high-cis polybutadiene (150 L) and 400 g of toluene, which are dissolved with stirring at 60° C. Then, 0.5 mmol of 2,4-dinitrobenzenesulfonyl chloride as a modifying agent previously dissolved in tetrahydrofuran is added and stirred at 60° C. for 2 hours. A polymer is obtained in a yield of approximately 100% by re-precipitating in isopropanol containing a slight amount of NOCRAC NS-5 and drying on a drum. In the polymer, the modification efficiency is 30%, the cis content is 97%, the number average molecular weight (Mn) is 181,000, and the vinyl bond content is 0.6%.

(Method of Preparing DEAB-Modified Anion Polymer 1 (Rubber Component 6))

A glass bottle of about 1 liter in volume provided with a rubber plug is dried and replaced with nitrogen, and a solution of dried and purified butadiene in cyclohexane and a dried cyclohexane are charged thereinto so as to render into a state of charging 400 g of a solution of 12.0% butadiene in cyclohexane. Then, 0.30 mL of tert-butyllithium (1.57M) and 0.185 mL of 2,2-di(2-tetrahydrofuryl)propane (0.2N) are added to conduct polymerization in a water bath of 50° C. for 1.5 hours. Thereafter, 0.42 mmol of 4,4'-diethylaminobenzophenone (DEAB) is added at 50° C. and further reacted for 1 hour. The resulting product is re-precipitated in isopropanol containing a slight amount of NOCRAC NS-5 and dried on a drum to obtain a polymer in a yield of approximately 100%. In the polymer, the modification efficiency is 87%, the cis content is 35%, the number average molecular weight (Mn) is 180,000, the vinyl bond content is 18%, and the styrene content is 0 mass %. The modification efficiency is calculated from an ultraviolet absorption of DEAB through a gel permeation chromatography.

(Method of Preparing Both Terminal-Modified Anion Polymer (Rubber Component 7))

A glass bottle of about 1 liter in volume provided with a rubber plug is dried and replaced with nitrogen, and a solution of dried and purified butadiene in cyclohexane and a dried cyclohexane are charged thereinto so as to render into a state of charging 330 g of a solution of 15.0 mass % butadiene in cyclohexane. Next, 0.513 mmol of hexamethyleneimine (HMI) is charged thereinto. Then, 0.36 mL of tert-butyllithium (1.57M) and 0.057 mL of 2,2-di(2-tetrahydrofuryl) propane (0.2N) are added to conduct polymerization in a water bath of 50° C. for 4.5 hours. Thereafter, 0.10 mmol of tin tetrachloride ($SnCl_4$) is added at 50° C. and further reacted for 1 hour. The resulting product is re-precipitated in isopropanol containing a slight amount of NOCRAC NS-5 and dried on a drum to obtain a polymer in a yield of approximately 100%. In the polymer, the modification efficiency is 62% in hexamethyleneimine and 87% in tin tetrachloride, the cis content is 35%, the number average molecular weight (Mn) is 180,000, the vinyl bond content is 18%, and the styrene content is 0 mass %. The modification efficiency of hexamethyleneimine is measured through a liquid chromatography, and as to tin tetrachloride the modification efficiency of polymer modified with DEAB under the same conditions as in tin tetrachloride is measured.

(Method of Preparing High-Styrene SBR (Styrene-Butadiene Rubber) Anion Polymer (Rubber Component 8))

Into an autoclave reactor of 5 liters in volume purged with nitrogen are charged 2750 g of cyclohexane, 2.06 g of tetrahydrofuran, 158 g of styrene, 150 g of 1,3-butadiene and 61.2 mg (0.17 mmol) of potassium dodecylbenzene sulfonate (DBS-K). After the temperature of the content in the reactor is adjusted to 40° C., 320 mg (5.0 mmol) of n-butyllithium is added to start polymerization.

At a time that the polymerization temperature reaches 55° C. (conversion of initially charged monomer is about 35%), 165 g of 1,3-butadiene is further added for 20 minutes. The maximum temperature reaches 83° C. At a time that the conversion reaches 99%, 10 g of butadiene is further added and polymerized for further 5 minutes, and then 0.42 mmol of 4,4'-diethylaminobenzophenone is added to conduct reaction for 15 minutes. The polymer solution after the reaction is added with 2,6-di-tert-butyl-p-cresol and subjected to a solvent removal through steam stripping without adding an extending oil and then dried through hot roll to obtain a non oil-extended rubber. The polymer has a number average molecular weight (Mn) of 181,000, a styrene content of 35 mass % and a vinyl bond content of 27%.

(Method of Preparing DEAB-Modified Anion Polymer (Rubber Component 9))

A glass bottle of about 1 liter in volume provided with a rubber plug is dried and replaced with nitrogen, and a solution of dried and purified butadiene in cyclohexane and a dried cyclohexane are charged thereinto so as to render into a state of charging 400 g of a solution of 12.0 mass % butadiene in cyclohexane. Then, 0.30 mL of tert-butyllithium (1.57M) and 0.185 mL of 2,2-di(2-tetrahydrofuryl)propane (0.2N) are added to conduct polymerization in a water bath of 50° C. for 1.5 hours. Thereafter, 0.35 mmol of 4,4'-diethylaminobenzophenone (DEAB) is added at 50° C. and further reacted for 1 hour. The resulting product is re-precipitated in isopropanol containing a slight amount of NOCRAC NS-5 and dried on a drum to obtain a polymer in a yield of approximately 100%. In the polymer, the modification efficiency is 55%, the cis content is 35%, the number average molecular weight (Mn) is 178,000, and the styrene content is 0 mass %. The modification efficiency is calculated from an ultraviolet absorption of DEAB through a gel permeation chromatography.

(Method of Preparing DEAB-Modified High-Cis Polybutadiene Rubber 3 (Rubber Component 10))

It is prepared by the same method as in rubber component 3 except that the polymerization temperature is 80° C. The resulting polymer has a cis-bond content of 84.2% and a vinyl bond content of 1.2%.

(Method of Preparing Modified Diene-Based Polymer 1 (Rubber Component 11))

Into an autoclave of 5 L purged with nitrogen are charged 2.4 kg of cyclohexane and 300 g of 1,3-butadiene. Into the autoclave is charged a catalyst composition, which preliminarily prepared by reacting and maturating a solution of neodymium versatate (0.09 mmol) as a catalyst component in cyclohexane, a solution of methylalumoxane (3.6 mmol) in toluene, hydrogenated diisobutylaluminum (5.5 mmol) and a solution of diethylaluminum chloride (0.18 mmol) in toluene at 40° for 30 minutes, and polymerized at 60° C. for 60 minutes to obtain a polymer solution. The conversion of 1,3-butadiene is approximately 100%.

Thereafter, the polymer solution is kept at 60° C. and added with a solution of polymethylene polyphenyl polyisocyanate (trade name "PAPI*135", made by Dow Chemical Japan Co., Ltd.) (4.16 mmol as converted to isocyanate group (NCO)) in toluene and reacted for 15 minutes (primary modification reaction). Subsequently, a solution of hexamethylenediamine (2.08 mmol) in toluene is added and reacted for 15 minutes (secondary modification reaction). Thereafter, polymerization is stopped by extracting with a methanol solution containing 1.3 g of 2,4-di-tert-butyl-p-cresol and solvent is removed by steam stripping and then drying is conducted on a roll at 110° C. to obtain a rubber component 11. As properties of the thus obtained rubber component 11 are measured by the above methods, the Mooney viscosity [ML1+4 (100° C.)] is 35, the molecular weight distribution (Mw/Mn) is 2.3, the cis content is 96.2%, and the vinyl bond content is 0.59%.

(Method of Preparing Modified Diene-Based Polymer 2 (Rubber Component 12))

A polymer solution is obtained by polymerizing in the same preparation method as in ythe polymer 11 and thereafter the polymer solution is kept at 60° C. and added with a solution of 1-trimethylsilyl-2-methylchloro-1-aza-2-silacyclopentane (2.08 mmol) in toluene and reacted for 15 minutes.

Thereafter, polymerization is stopped by extracting with a methanol solution containing 1.3 g of 2,4-di-tert-butyl-p-cresol and solvent is removed by steam stripping and then drying is conducted on a roll at 110° C. to obtain a rubber component 12. As properties of the thus obtained rubber component 12 are measured by the above methods, the Mooney viscosity [ML1+4 (100° C.)] is 35, the molecular weight distribution (Mw/Mn) is 2.1, the cis content is 96.4%, and the vinyl bond content is 0.62%.

(Method of Preparing DEAB-Modified Anion Polymer 3 (Rubber Component 13))

It is prepared by the same preparation method as in the rubber component 6 except that N,N-bistrimethylsilyl-aminopropylmethyl diethoxysilane is used as a modifying agent.

(Method of Preparing Modified Diene-Based Polymer 3 (Rubber Component 14))

To 400 ml of dichloromethane in a glass flask provided with a stirrer is added 36 g of 3-aminopropylmethyl diethoxysilane as an aminosilane site under a nitrogen atmosphere and further 48 ml of trimethylsilane chloride (made by Aldrich Corp.) as a protection site and 53 ml of triethylamine are added to the solution and stirred at room temperature for 17 hours, and thereafter the solvent is removed by placing the reaction solution into an evaporator to obtain a reaction mixture. The reaction mixture is distilled under a reduced pressure at 5 mm/Hg to obtain 40 g of N,N-bis(trimethylsilyl) aminopropylmethyl diethoxysilane as a 130-135° C. fraction.

Then, 2750 g of cyclohexane, 41.3 g of tetrahydrofuran, 125 g of styrene and 375 g of 1,3-butadiene are charged into an autoclave of 5 L purged with nitrogen. After the temperature of the content in the reactor is adjusted to 10° C., 215 mg of n-butyllithium is added to start polymerization. The polymerization is carried out under adiabatic condition and the maximum temperature reaches 85° C.

At a time that the conversion is 95%, 10 g of butadiene is further added and polymerized for 5 minutes. After a small amount of a polymer solution is sampled from the reactor into 30 g of a cyclohexane solution containing 1 g of methanol, 1129 mg of N,N-bis(trimethylsilyl)aminopropylmethyl diethoxysilane obtained by the above reaction is added to conduct modification reaction for 15 minutes. Then, 8.11 g of titanium ethylhexyl dioleate is added and further stirred for 15 minutes. Finally, the polymer solution after the reaction is added with 2,6-di-tert-butyl-p-cresol. Next, a rubber component 14 is obtained by steam stripping to remove the solvent and drying on a roll of 110° C.

In Comparative Examples 1-4, 7 and 8, non-modified high-cis polybutadiene rubber (Comparative Example 1), non-modified low-cis polybutadiene rubber (Comparative Example 2), DEAB-modified high-cis polybutadiene rubber 1 (Comparative Example 3), DEAB-modified anion polymer 1 (Comparative Example 4), 2,4-dinitrobenzenesulfonyl chloride-modified high-cis polybutadiene rubber (Comparative Example 7) and both terminal-modified anion polymer (Comparative Example 8), respectively, and natural rubber are compounded into a rubber composition. The values of 3% tan δ and wear resistance represented by index on the basis that Comparative Example 1 is 100 are deteriorated in Comparative Example 2. In Comparative Examples 3 and 7, these values are improved, but the width thereof is small. In Comparative Examples 4 and 8, the value of 3% tan δ is improved, but the value of the wear resistance is deteriorated. In Comparative Example 5 compounded with the combination of non-modified high-cis polybutadiene rubber and DEAB-modified anion polymer 1, the value of 3% tan δ is somewhat improved, but the value of the wear resistance lowers. In Comparative Example 6 wherein the combination of DEAB-modified high-cis polybutadiene rubber 1 and DEAB-modified anion polymer 1 is compounded outside the range defined in the invention, the value of 3% tan δ is improved, but the value of the wear resistance lowers. In Comparative Example 9 using the combination of DEAB-modified high-cis polybutadiene rubber 1 and high-styrene SBR anion polymer, the value of 3% tan δ is improved, but the value of the wear resistance is not improved. In this case, the value of left side of the equation (I) is not more than 11, while the shape of tan δ peak is two mountains, which shows that the DEAB-modified high-cis polybutadiene rubber 1 is not compatible with the high-styrene SBR anion polymer. In Comparative Example 10 using the combination of DEAB-modified high-cis polybutadiene rubber 1 and DEAB-modified anion polymer 2, since the value of left side of the equation (I) exceeds 11, the improving width of the value of 3% tan δ is small as compared with those of the examples.

In Examples 1-3 compounding the combination of DEAB-modified high-cis polybutadiene rubber 1 and DEAB-modified anion polymer 1 into the rubber composition, the values of 3% tan δ and wear resistance are largely improved. Moreover, when the amount of DEAB-modified anion polymer compounded is too large, the value of 3% tan δ is largely improved, while the value of the wear resistance is not improved (Example 3), so that it is understood that the ratio (A)/(B) is preferably within a range of 30/70-90/10. Even in Example 4 using the combination of DEAB-modified high-cis polybutadiene rubber 2 and DEAB-modified anion polymer 1, the values of 3% tan δ and wear resistance are improved. Furthermore, the values of 3% tan δ and wear resistance are largely improved even in Example 5 compounding the combination of 2,4-dinitrobenzenesulfonyl chloride-modified high-cis polybutadiene rubber and DEAB-modified anion polymer 1 into the rubber composition, Example 6 compounding the combination of DEAB-modified high-cis polybutadiene rubber 1 and both terminal-modified anion polymer into the rubber composition, Examples 7 and 8 compounding the combination of modified diene-based polymer and both terminal-modified anion polymer into the rubber composition, Example 9 compounding the combination of DEAB-modified high-cis polybutadiene rubber and DEAB-modified anion polymer into the rubber composition, and Example 10 compounding the combination of DEAB-modified high-cis polybutadiene rubber and modified diene-based polymer into the rubber composition. Moreover, in each example, the shape of tan δ peak is one mountain, and the value of left side of the equation (I) is not more than 11.

The invention claimed is:

1. A rubber composition characterized by compounding a filler to a rubber component containing (A) a modified conjugated diene rubber having a cis-bond content in conjugated diene portion of not less than 87% and a vinyl bond content of not more than 2% and containing a functional group reactive with a filler and produced by coordination polymerization and (B) a modified polymer having a modifying functional group number per 1 molecule of an unmodified polymer of not less than 0.6 and produced by anion polymerization, and satisfying a relation of the following equation (I) with the filler, the conjugated diene rubber (A) and the modified polymer (B):

$$S_F \times W_F \times 10^7 / (W_A \times f_A / M_n(A) + W_B \times f_B / M_n(B)) \leq 11 \quad (I)$$

wherein $S_F$: cetyltrimethylammonium bromide (CTAB) adsorption specific surface area ($m^2/g$) of a filler, $W_F$: amount (parts by mass) of a filler compounded per 100 parts by mass of a rubber component, $W_A$: amount (parts by mass) of a modified conjugated diene rubber (A) compounded per 100 parts by mass of a rubber component, $W_B$: amount (parts by mass) of a modified polymer (B) compounded per 100 parts by mass of a rubber component, $M_n(A)$: number average molecular weight of a modified conjugated diene rubber (A), $M_n(B)$: number average molecular weight of a modified polymer (B), $f_A$: modifying functional group number per 1 molecule of a modified conjugated diene rubber (A), and $f_B$: modifying functional group number per 1 molecule of a modified polymer (B).

2. A rubber composition according to claim 1, wherein the modified conjugated diene rubber (A) has a cis-bond content of not less than 94% and a vinyl bond content of not more than 1%.

3. A rubber composition according to claim 1, wherein the modifying functional group number of the modified polymer (B) per 1 molecule of the unmodified polymer is not less than 1.0.

4. A rubber composition according to claim 1, wherein the modified polymer (B) has a functional group in at least one terminal.

5. A rubber composition according to claim 1, wherein a total content of the modified conjugated diene rubber (A) and the modified polymer (B) in the rubber component is not less than 10 mass%.

6. A rubber composition according to claim 5, wherein the total content of the modified conjugated diene rubber (A) and the modified polymer (B) in the rubber component is not less than 20 mass%.

7. A rubber composition according to claim 1, wherein a mass ratio ((A)/(B)) of the modified conjugated diene rubber (A) to the modified polymer (B) is 30/70-90/10.

8. A rubber composition according to claim 1, wherein the rubber component further contains natural rubber or isoprene rubber.

9. A rubber composition according to claim 1, wherein the modified polymer (B) is a modified polymer produced by anion polymerization and is a polymer having a structure of cis content of not more than 60%, vinyl bond content of not less than 10% and styrene content of not more than 20 mass% and being compatible with the modified conjugated diene rubber (A).

10. A rubber composition according to claim 1, wherein the modified conjugated diene rubber (A) has a modifying functional group number of not less than 0.2 per 1 molecule of an unmodified polymer.

11. A rubber composition according to claim 1, wherein the modified conjugated diene rubber (A) is a terminal-modified high-cis polybutadiene rubber.

12. A rubber composition according to claim 1, wherein an inorganic filler and/or carbon black as the filler is included in an amount of 10-100 parts by mass per 100 parts by mass of the rubber component.

13. A rubber composition according to claim 1, which is sulfur-cross-linkable.

14. A tire characterized by using a rubber composition as claimed in claim 1 in any of tire constitutional members.

15. A tire according to claim 14, wherein the tire constitutional member is at least any one of tread, side rubber, rubber chafer and bead filler.

* * * * *